(12) United States Patent (10) Patent No.: US 12,619,298 B2

Smith (45) Date of Patent: May 5, 2026

(54) PAPER-BASED PLANNING AND JOURNALING SYSTEM AND METHOD

(71) Applicant: J. Todd Wesley Smith, Annapolis, MD (US)

(72) Inventor: J. Todd Wesley Smith, Annapolis, MD (US)

( * ) Notice: Subject to any disclaimer, the term of this patent is extended or adjusted under 35 U.S.C. 154(b) by 115 days.

(21) Appl. No.: 18/614,858

(22) Filed: Mar. 25, 2024

(65) Prior Publication Data

US 2025/0298461 A1    Sep. 25, 2025

(51) Int. Cl.
| | |
|---|---|
| *G06F 3/01* | (2006.01) |
| *B42D 3/12* | (2006.01) |
| *B42D 3/18* | (2006.01) |
| *G06V 30/148* | (2022.01) |

(52) U.S. Cl.
CPC ................. *G06F 3/011* (2013.01); *B42D 3/12* (2013.01); *B42D 3/18* (2013.01); *G06V 30/153* (2022.01)

(58) Field of Classification Search
CPC ......... G06F 3/011; G06V 30/153; B42D 3/12; B42D 3/18
See application file for complete search history.

(56) References Cited

U.S. PATENT DOCUMENTS

| | | | | |
|---|---|---|---|---|
| 5,433,546 A | * | 7/1995 | Kershaw | ................ B42D 5/042 |
| | | | | 281/38 |
| 2019/0279163 A1 | * | 9/2019 | Sanders | ............. G06Q 10/1093 |

* cited by examiner

*Primary Examiner* — Kwang-Su Yang

(57)    ABSTRACT

The present invention discloses a paper-based planning and journaling system. The system comprises a planner configured to enable recording of information on paper and with potential for transfer to a digital format and one or more control modules in communication with the planner and at least one server in communication with a database. The server is configured to receive planner data and external data of the user. The planner data includes schedule-related data, task-related data, notes-related data, priority related data of schedules and tasks, and preferences-related data, and the external data includes biofeedback data, neural feedback data, biometric data and environmental data. The server enables the planner to provide dynamic multi-sensory feedback for the schedules and tasks based on the planner data and the external data. The control module enables the user to control and customize automated conditions for multi-sensory feedback.

15 Claims, 11 Drawing Sheets

152

160 162

156

158

152

168

164 166 170 172 174

25:00

PAPER-BASED PLANNING AND JOURNALING SYSTEM AND METHOD

TECHNICAL FIELD

The present invention generally relates to planning and journaling system. More specifically, the present invention relates to a paper-based planning and journaling system integrating multi-sensory feedback mechanisms with a traditional physical paper-based planner.

BACKGROUND

Traditional planning systems include paper-based planners and digital planners. The paper-based planner provides daily, weekly, and monthly calendars in which the user may enter schedules, tasks, or other important information. Also, the paper-based planner may provide other task management systems, such as "to-do lists," address directories, maps, expense tracking columns, lists of holidays, personal care goals and tasks, business card holders, and any other information or resource that the user wishes to have at their fingertips. Users of paper-based planners and journaling systems usually write their goals, tasks and schedules in the planner but fail to follow through with tasks due to lack of automated reminders, technology-driven behavioral cues, and reward mechanisms for desired behaviors.

The digital planner includes a portable computing device, which provides all the features of the paper-based planner in a digitized format and has become widely used. However, both the paper-based planner and the digital planner have distinct advantages and limitations.

Unfortunately, to access information in the digital planner, the digital planner must first be turned on and then the user must explore a directory of information links prior to accessing that information. This is required for even the simplest and most frequently accessed information, making paper-bound planners the preferred choice for some tasks and information retrieval. In addition, the digital planner may lose all stored data in the event of losing power, which highlights another distinct benefit of paper-based planners.

In summary, digital planners offer convenience and accessibility but often lack the physical, tactile experience desired in paper-based planner systems This tactile engagement with a user's handwriting has been shown in several studies to promote memory, recall, and focus. Conversely, traditional paper planners fail to incorporate the dynamic, real-time functionalities afforded by digital planners. This includes the ability for the user to receive automated reminders and alerts with regards to their schedules and tasks. Both paper-based planners and digital planners, in their standard forms, fall short of fully leveraging modern technological advancements to enhance user productivity, engagement, and well-being.

Selected patents that reference planning systems are discussed as follows.

US20080174412 of Sward Kurt, entitled "Electronic alert system for manual planner" discloses a binder system combining a binder and an electronic reminder component or electronic reminder module. The binder system is provided to merge a manual handwritten component with an electronic reminder component. The electronic reminder module electronically stores reminder events and provides at least one of an audible alarm signal and a visual alarm signal upon the occurrence of one of the entered reminder events.

U.S. Pat. No. 5,525,958 of Negishi Hidetaka entitled "Electronic appointment organizer with paper pad for providing handwritten information correlated to appointments" discloses an appointment reminder comprising a display, a keyboard, a processor, and memory storage. The display is configured to display one or more appointment identifiers. The keyboard has an appointment key for initiating an appointment setting program and set keys for setting an appointment time. The processor is included for executing the appointment setting program which associates the appointment time with an appointment identifier. A memory is included for storing the appointment time, the appointment identifier, the appointment setting program and the appointment notice program. A clock provides timing for the operation of the processor.

However, while the existing prior references utilize paper, they fail to provide an immersive and customizable reminder system that leverages external companion technology to guide the user toward desired behaviors and outcomes. The lack of options to tailor reminders to their specific preferences, situations, and needs leads to a less engaging and effective planning experience. Moreover, the current system relies on static synchronization of schedules. The rigidity in scheduling results in missed deadlines and overlooked important tasks. Without the flexibility to adapt to changes or individual priorities, users fail to keep up with their obligations and commitments, ultimately impacting their productivity and effectiveness.

Therefore, there is a need for a planning and journaling system that addresses one or more of aforementioned drawbacks.

SUMMARY

The present invention discloses a paper-based planning and journaling system utilizing sensory cues on and in the planner's cover or inner components. The system comprises at least one planner, notebook, or journal and, one or more control modules, and at least one server. The planning and journaling system (herein referred to as "planner") is configured to enable recording of information on paper giving the user an option for subsequent storage in a digital system. Further, the planning and journaling system's sensory components are configured to receive information from a control system. The planner system comprises a control system and one or more electronic modules in communication with the control system. One or more electronic modules comprise a network module, a display, one or more buttons, a global positioning system (GPS) module, a temperature sensor, an accelerometer, a haptic motor, one or more audio devices, one or more ports, a microphone, one or more cameras, a removable near field communication (NFC) card and a detachable or fixed remote controller device.

One or more control modules are in communication with the at least one planner. One or more control modules and the at least one planner are associated with a user. One or more control modules enable the user to control and customize multi-sensory feedback. One or more control modules comprise a mobile application on a mobile device or tablet, an application on personal computer, a wearable device configured to monitor biofeedback of the user, a neural device configured to provide neural feedback of the user, an augmented reality headset, a controller device, a user device, a display affixed to the at least one planner, the buttons of the at least one planner, and one or more technological virtual assistants. One or more control modules enable users to customize duration, intensity, and type of sensory feedback. The sensory feedback includes messages, alerts, and notifications. One or more control modules enable the user to customize timing, duration, intensity, and type of feedback via voice control.

At least one server is in communication with the one or more control modules and the at least one planner. At least one server is configured to receive planner data from the user. The planner data includes schedule-related data, task-related data, notes-related data, priority related data of schedules and tasks, and preferences-related data. At least one server is configured to receive external data of the user. The external data includes biofeedback data, neural feedback data, biometrics data and environmental data. The environmental data includes light data, location data, weather data, temperature data and sound data. At least one server is configured to enable the at least one planner to provide multi-sensory feedback for the schedules and tasks. The multi-sensory feedback comprises visual feedback, acoustical feedback, scent feedback and haptic feedback. At least one server is configured to manage and adjust one or more parameters of the at least one planner in real-time. The parameters include light, pattern of display and audio. At least one server is configured to dynamically customize the multi-sensory feedback in real-time based on the external data and user data. At least one server is configured to dynamically customize the one or more parameters of the at least one planner in real-time based on the external data and user data.

At least one server comprises an artificial intelligence module. Further, the at least one server is configured to suggest one or more tasks in open time blocks based on the planner data and the external data. At least one server is configured to continuously analyze planner data and external data in real-time to manage parameters of the at least one planner and the multi-sensory feedback. At least one server is configured to receive gesture related information of the user to manage parameters of the at least one planner and the multi-sensory feedback. At least one server is configured to reorganize schedules and tasks to align with user goals.

The above summary contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF EXAMPLE EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
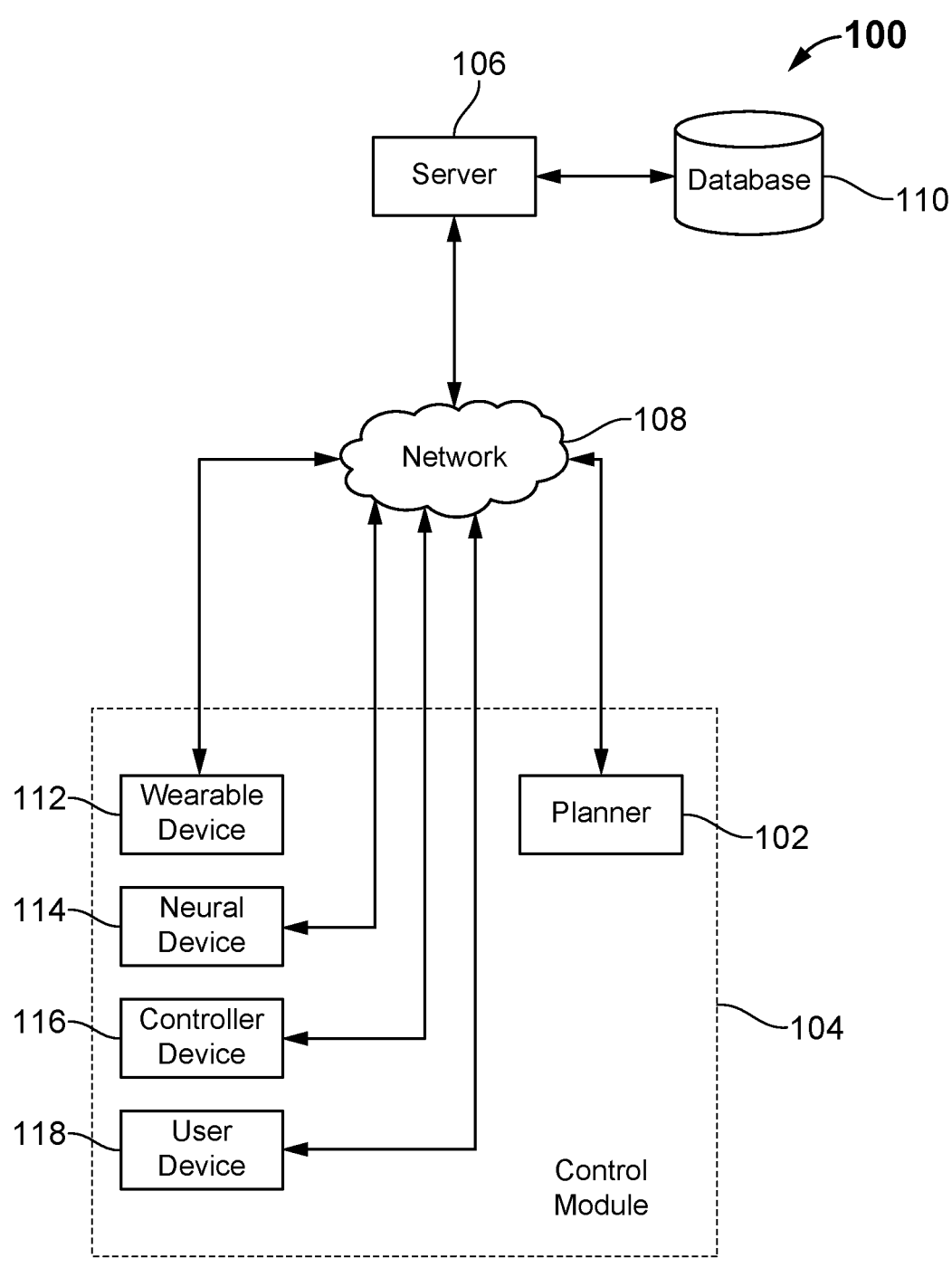
FIG. 1 exemplarily illustrates an environment of a paper-based planning and journaling system, according to an embodiment of the present invention.

FIG. 1 exemplarily illustrates an environment 100 of a paper-based planning and journaling system, according to an embodiment of the present invention. The system comprises at least one planner 102, one or more control modules 104 and at least one server 106. The at least one planner 102, the one or more control modules 104 and the at least one server 106 are in communication with one another via a network 108. The system further comprises at least one database 110 in communication with the at least one server 106. One or more control modules 104 and the at least one planner 102 are associated with a user.

One or more control modules 104, include, but not limited to, a wearable device 112, a neural device 114, a controller device 116 and a user device 118. In one embodiment, the controller device 116 comprises a remote controller device 152 (shown in FIG. 7). In another embodiment, the controller device 116 is detachably embedded in the at least one planner 102. The wearable device 112 is configured to provide biofeedback of the user and the neural device 114 is configured to provide neural feedback of the user.

The user device 118 is associated with a user. The user device 118 includes, but not limited to, a desktop computer, a laptop computer, a mobile phone, a personal digital assistant, and the like. The user device 118 is configured to execute one or more client applications such as, without limitation, a web browser to access and view content over the network 108, and a File Transfer Protocol (FTP) client for file transfer. The user device 118 in various embodiments, may include a Wireless Application Protocol (WAP) browser or other wireless or mobile device protocol suites.

The network 108 generally represents one or more interconnected networks, over which the at least one server 106 and the user device 118 could communicate with each other. The network 108 may include packet-based wide area networks (such as the Internet), local area networks (LAN), private networks, wireless networks, satellite networks, cellular networks, paging networks, and the like. A person skilled in the art will recognize that the network 108 may also be a combination of more than one type of network. For example, the network 108 may be a combination of a LAN and the Internet. In addition, the network 108 may be implemented as a wired network or a wireless network or a combination thereof.

The system further comprises at least one database 110 in communication with the at least one server 106. In an example, the database 110 resides in the at least one server 106. In another example, the database 110 resides separately from the at least one server 106. Regardless of the location, the database 110 comprises a memory to store and organize data for use by the at least one server 106. The database 110 comprises information for use by the at least one server 106.

In one embodiment, the at least one server 106 is at least one of a general-purpose computer, a special-purpose computer, a workstation, a desktop, a laptop, a tablet, a mobile phone, a mainframe, a supercomputer and a server farm. Although the at least one server 106 is illustrated as a single device, the functions performed by the at least one server 106 could be performed using any suitable number of computing devices. At least one server 106 comprises at least one memory configured to store a set of program modules and at least one processor. The processor is configured to execute the modules to perform one or more operations of the system. At least one server 106 further comprises an artificial intelligence module. In one embodiment, the at least one server 106 is a cloud server.

Figure 2:
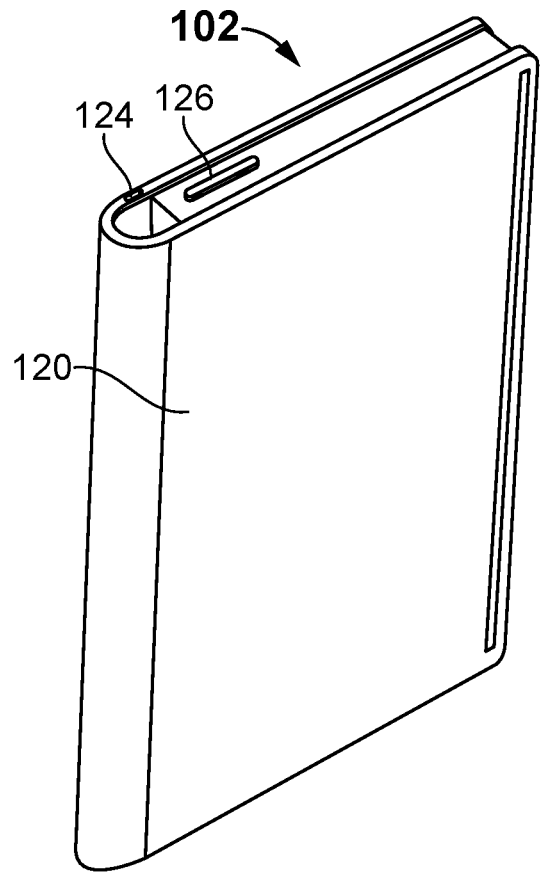
FIG. 2 exemplarily illustrates a perspective view of a planner of FIG. 1.
Figure 3:
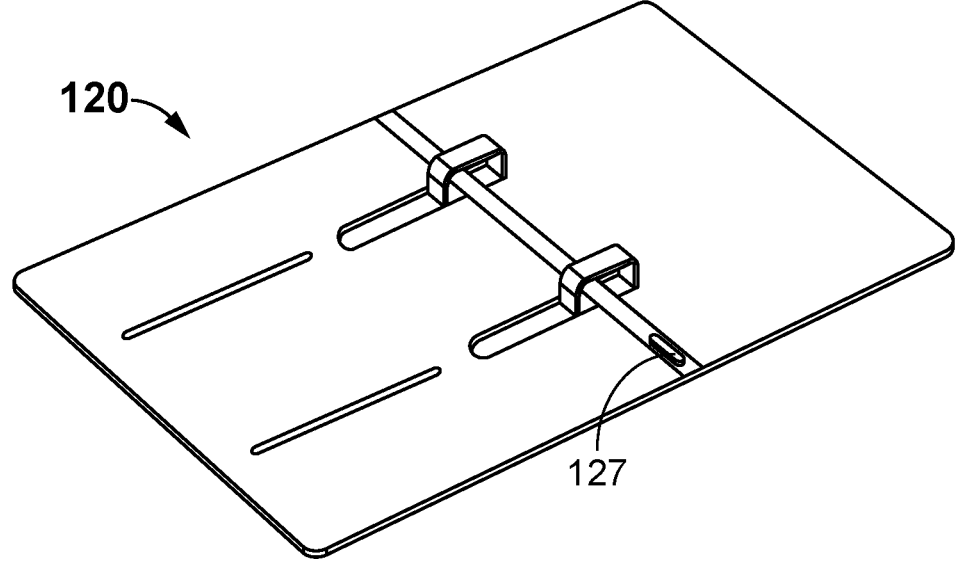
FIG. 3 exemplarily illustrates a perspective view of a cover of the planner of FIG. 1.
Figure 4:
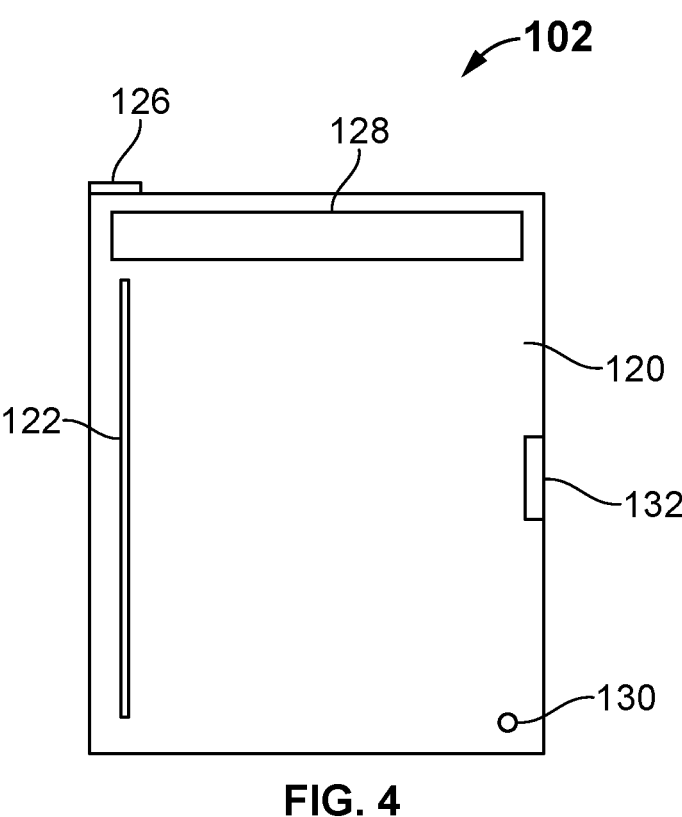
FIG. 4 exemplarily illustrates a front view of the planner of FIG. 1.

Referring to FIG. 2 to FIG. 6, the at least one planner 102 comprises a control system and one or more electronic modules. One or more electronic modules are embedded at different portions on a cover 120 of the at least one planner 102. The control system is a central motherboard configured to send and receive signals related to multi-sensory feedback signals. Referring to FIG. 2 and FIG. 3, one or more electronic modules comprise a light source 122, an electronic port 124 and one or more buttons 126. Referring to FIG. 4, one or more electronic modules further comprise a display 128, the light source 122, the button 126 to control the light source 122, a scent release mechanism 130. Further, at least latch 132 is provided at a front side of the cover 120 of the at least one planner 102. In addition, the at least one planner 102 comprises a control interface for manipulating sensory feedback of the at least one planner 102, which can serve simultaneously as a physical bookmark 127. The planner's bookmark 127 serves as a detachable remote.

Figure 5:
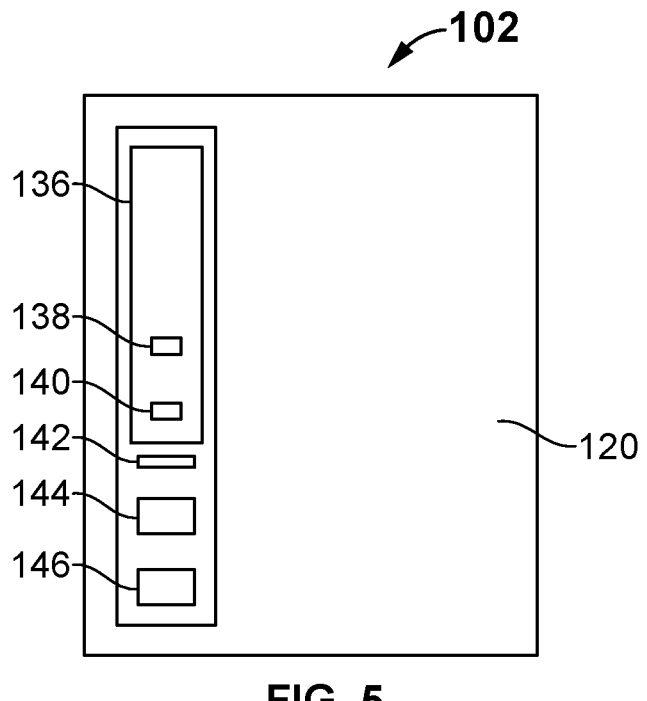
FIG. 5 exemplarily illustrates a rear view of the planner of FIG. 1.

Referring to FIG. 5, one or more electronic modules further comprises the control system 136, a network module, a global positioning system (GPS) module 138, a temperature sensor 140, an accelerometer 142, a haptic motor 144, and one or more audio devices 146 comprises an audio driver.

Figure 6:
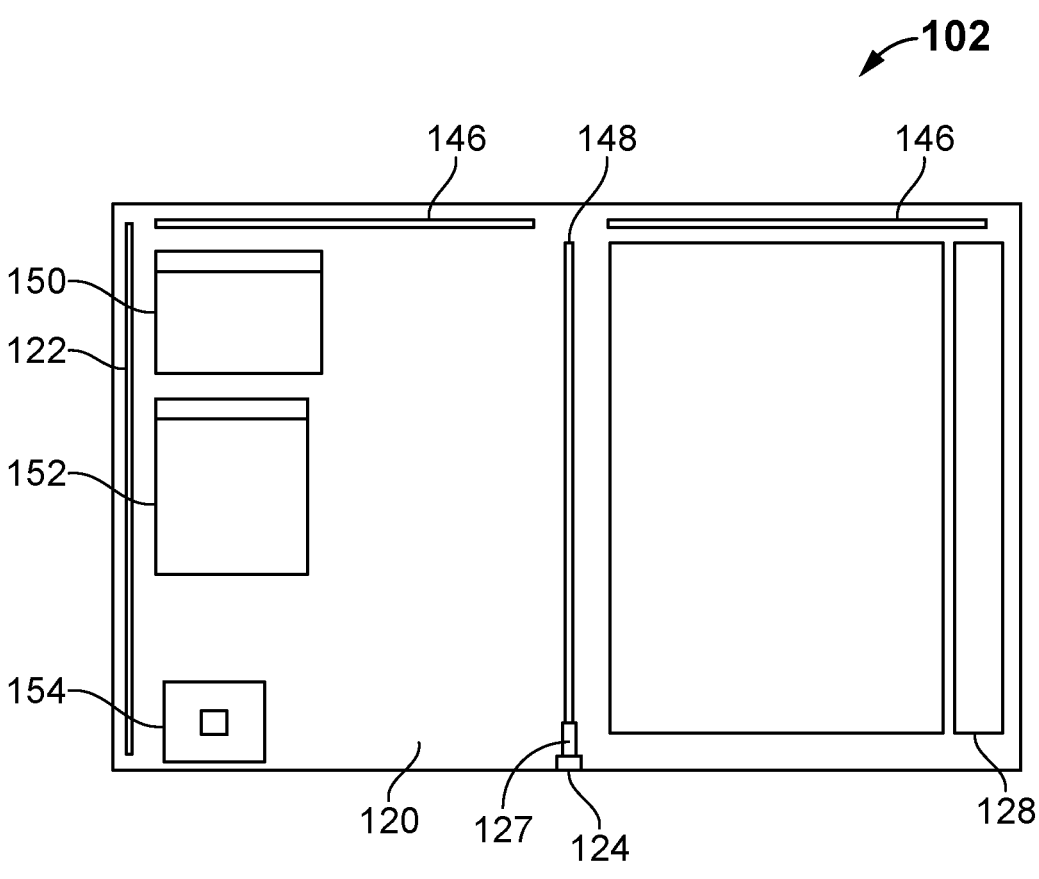
FIG. 6 exemplarily illustrates an arrangement of components of the planner at the cover of FIG. 1.

Referring to FIG. 6, one or more electronic modules further comprises one or more electronic ports 124, the audio devices 146 comprising the audio driver, the display 128, a microphone, one or more cameras, a removable near field communication (NFC) card, a near field communication (NFC) business card 150, a detachable remote controller device 152, light source 122 and near field communication (NFC) tap 154 to connect circuitry. The near field communication (NFC) card is designed for quick and easy information sharing. The display 128 is a touch display. The system enables the user to customize and set up a digital profile using non-fungible tokens (NFT). This profile facilitates the exchange of contact, unique art, and business information.

The cover 120 further comprises a pen holder 148. In one embodiment, the pen holder 148 is a magnetic pen holder 148. The port 124 is at least one of a USB-port, and a USBC port. The port 124 enables to charge the at least one planner 102 and enables to synchronize data to and from the planner 102. Further, the audio devices 146 are disposed at multiple locations of the at least one planner 102. One or more electronic modules further comprise battery, Wi-Fi and Bluetooth®.

One or more electronic modules including the light source 122, audio device 146, display 128 and haptic motor 144 are strategically integrated to the at least one planner 102 to provide a comprehensive multi-sensory feedback system. The light source 122 is configured to provide visual alerts, the display 128 is configured to display messages and reminders, the audio device 146 is configured to provide auditory notifications and the haptic motor 144 is configured to provide tactile alerts. In one embodiment, the display 128 is a E-ink screen.

In one embodiment, the display 128 is a capacitive touchscreen consisting of an insulator, such as glass, coated with a transparent conductor, such as indium tin oxide (ITO) and utilizing OLED, LCD, or e-ink technology, comprising: embedded circuitry enabling signal communication with the at least one planner 102; and embedded circuitry to synchronize with the at least one server 106 and the one or more control modules 104, facilitating the real-time display of schedules, task updates, notes, biofeedback, and other user data.

At least one planner 102 further comprises a recording module for capturing user biometrics in order to enable biometric-based activation or adaptation of the at least one planner. The recorder module includes a camera, which records and stores live user biometrics data on a local drive, and the at least one server 106.

Figure 7:
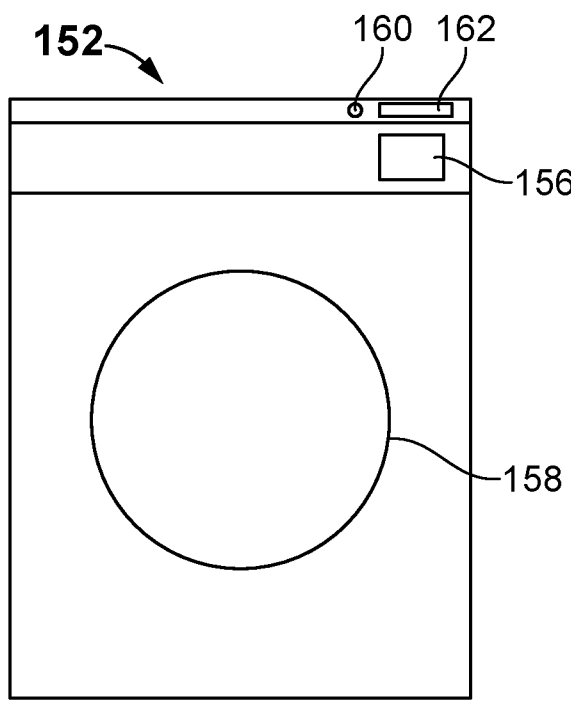
FIG. 7 exemplarily illustrates a back panel of a remote controller device, according to an embodiment of the present invention.

Referring to FIG. 7, the back panel of the remote controller 152 comprises an LED 160, an USBC port 162, a camera 156, and a magnetic charging area 158. The LED 160 is a small indicator placed within the surface. The LED 160 is configured to light up or change the color of the light according to the charging status. The LED 160 is configured to emit a red, green, and amber color. The red light indicates the charging mode, the green light indicates the fully charged status and the blinking of the amber light indicates a charging error. The USBC port 162 is configured on the top panel for manual charging or syncing. The magnetic charging area 158 comprises a wireless charging zone and a magnetic alignment system. The magnetic charging area 158 is outlined subtly by a slightly recessed circle or designated marking to indicate the charging contact point. The magnetic charging area 158 integrates magnetic alignment features to ensure correct positioning on the charging pad. The magnetic alignment system utilizes neodymium magnets or a similar high strength magnetic system for secure attachment and efficient power transfer. The wireless charging standard is Qi, as the remote supports the Qi wireless charging protocol. The material used for the magnetic charging area 158 construction is durable polycarbonate material or a similar capable material that could withstand daily use while maintaining the integrity of the magnetic charging connections. The battery, remote circuitry, Wi-Fi, and Bluetooth circuitry are housed in the top panel behind the screen.

Figure 8:
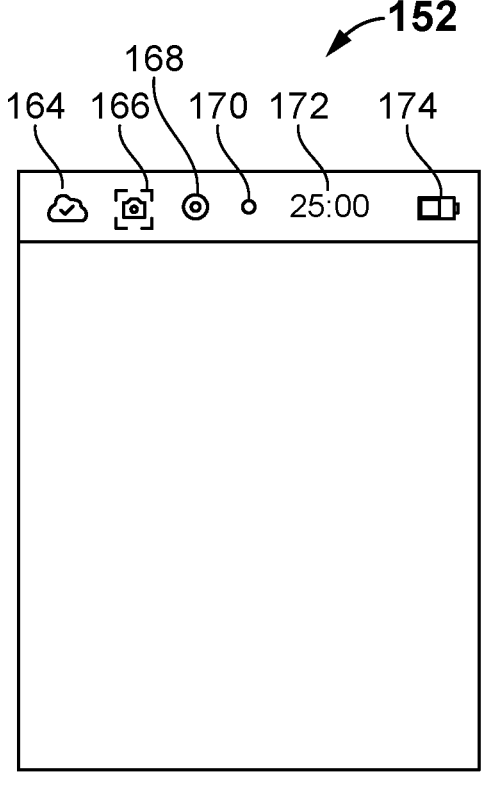
FIG. 8 exemplarily illustrates a front panel of a remote controller device, according to an embodiment of the present invention.

Referring to FIG. 8, the front panel of the remote controller 152 displays a synchronization status 164, an optical character recognition (OCR) activation icon 166, the status of microphone 168, a microphone 170, a timer display 172, and a charge level of battery 174. The front panel is a transparent glass or polymer overlay with embedded silver nanowire conductors. The front panel has an underlying OLED or e-ink display.

At least one planner 102 is configured to enable recording of information on paper and in digital format. At least one server 106 is configured to receive planner data and external data of the user. In one embodiment, the planner data includes, but not limited to, schedule related data, task related data, notes related data, priority related data of schedules, and tasks and preferences related data. In one embodiment, the external data includes, but not limited to, biofeedback data, neural feedback data, biometrics data and environmental data. At least one server 106 also ensures that the planner data are up-to-date and accessible by the user. The biofeedback and neural feedback data are collected from applications and wearable or implanted sensors of user, including alarms, sleep schedules, activity level, steps, heart rate variability, stress levels, and brain activity, via Bluetooth®, USB-C connection, or Wi-Fi.

At least one server 106 further enables the at least one planner 102 to provide multi-sensory feedback for the schedules and tasks. For example, a task scheduled for 10 AM activates a light cue or sound alert at the specified time, reminding the user of the task. At least one server 106 is further configured to manage and adjust one or more parameters of the at least one planner 102 in real-time. The parameters include, but not limited to, light, pattern of display and audio.

The parameters include environmental parameters such as ambient lighting or soundscapes to create an optimal work environment, directly influencing the user's productivity and overall experience. At least one planner 102 measures a user's environmental temperature, sound, air quality, and lighting and sends this data to a drive and the at least one server 106 for use in controlling the at least one planner 102. The global positioning system (GPS) module 138 is configured to gather and measure the user's precise location coordinates and weather conditions, including but not limited to temperature, barometric pressure, and precipitation and stores this data on the at least one server 106 for use in controlling the at least one planner or notebook's light and other sensory cues.

At least one server 106 is further configured to customize the multi-sensory feedback in real-time based on the external data and user data. At least one server 106 is further configured to customize the one or more parameters of the at least one planner 102 in real-time based on the external data and user data. One or more control modules 104 enable the user to control and customize the multi-sensory feedback. In one embodiment, the multi-sensory feedback comprises visual feedback, acoustical feedback, scent feedback and haptic feedback. The feedback includes messages, alerts and notifications.

At least one server 106 is further configured to suggest one or more tasks in open time blocks based on the planner data and the external data. The system comprises an image recognition module for processing and analyzing data recorded in the at least one planner 102. The system takes an image of the user's handwritten and pre-printed task or schedule inputs on the paper. The Image recognition module sends the scheduling inputs to a local device or the at least one server 106 which uses artificial intelligence (AI) or pre-defined code commands to process the user's available time for a given period. Thereafter, tasks are suggested in open time blocks for completion, or automated scheduling is performed by the at least one server 106. In another embodiment, the system utilizes optical character recognition (OCR) or intelligent character recognition (ICR) to read and process the user's handwritten documents.

At least one server 106 is configured to continuously analyze planner data and external data in real-time to dynamically manage the parameters of the at least one planner and the multi-sensory feedback. At least one server 106 is further configured to reorganize schedules and tasks to align with user goals.

At least one server 106 is configured to continuously analyze planner data and external data in real-time to refine and personalize the user experience. This analysis supports adaptive learning, where the system becomes more attuned to the user's habits and preferences over time. The system dynamically customizes the multi-sensory feedback and environmental parameters in real-time based on external data and user data, incorporating voice recognition (VR), optical character recognition (OCR), intelligent character recognition (ICR), artificial intelligence (AI), natural language processing (NLP), near field communication (NFC), and non-fungible tokens (NFT).

At least one server 106 enables control over various environmental parameters that influence user experience and productivity, such as ambient light, room temperature, scents, air conditions, and sounds, sending signals to the at least one planner 102 or notebook, and aligns the environmental parameters with the user's planning activities.

In one embodiment, the system enables to control the at least one planner 102 via the button 126. The button 126 enables to activate customizable sensory timer controls. In an example, the button 126 is a tactile button. In an example, the button 126 embedded within the body of the at least one planner 102 is designed to initiate a 15-minute light-cued timer when pressed briefly and a 1-hour timer incorporating light and other sensory cues (e.g., sound, vibration) when held. The control device 104 allows users to personalize the duration, intensity, and type of sensory cues associated with both the 15-minute and 1-hour timers. At least one server 106 updates the at least one planner 102 regarding the timing mechanism based on user preferences set through the one or more control modules 104, ensuring that the sensory cues reflect the user's latest customizations.

In one embodiment, the system uses accelerometer 142 to customize the multi-sensory feedback. The accelerometer 142 detects the opening, closing, and movements of the at least one planner 102. The data related to opening, closing, and movements of the at least one planner 102 is referred as accelerometer data. The accelerometer data is received at the internal circuitry of the at least one planner 102, the one or more control modules 104, or the at least one server 106 to manage and monitor the activation of the planner's light and other sensory cues. At least one server 106 analyzes user's environmental conditions and weather conditions and adapts the planner's light timing, intensity, pattern, and color, along with sound and other sensory cues based on the analysis of previously mentioned conditions.

At least one server 106 is further configured to receive neural feedback of the user from worn neural feedback sensors, embedded neural feedback sensors, or other neural feedback sensors. At least one server 106 translates neural feedback into data or commands to customize the multi-sensory feedback. At least one server 106 is configured to synchronize planner data and external data in real time across the at least one planner 102 and the one or more control modules 104.

At least one server 106 is further configured to inputs such as user commands (via touch, neural feedback, or voice), time of day, specific task requirements, task priority, user feedback, and preferences, and translates these inputs to provide multi-sensory feedback to the at least one planner 102.

The multi-sensory feedback being provided to the at least one planner 102 is customized in response to real-time changes in user's environmental factors, (comprising user location, environmental temperature, lighting, sound acoustics, frequencies and intensities), and users data, (including neural and biofeedback, biometrics, schedules, predefined priorities or goals, productivity data, user habits and behaviors). The productivity data refers to a collection of metrics and records that evaluate and enhance user productivity. The productivity data includes user schedules, records of completed and incomplete tasks, interaction with the at least one planner, journal, notebook, application, and mobile device usage, and handwritten documentation.

The system further comprises a voice processing module to capture and interpret user voice commands upon specific customizable prompts, and translate the commands into specific commands to activate or adjust the multi-sensory feedback. One or more control modules 104 further enable the user to use voice commands to control the at least one planner 102.

At least one server 106 is configured to receive gesture related information of the user to manage parameters of the at least one planner and the multi-sensory feedback. At least one server 106 further enables the at least one planner 102 to display custom messages and the day's agenda, sourced from user-defined tasks, routines, and schedules, within the at least one planner 102. The system allows users to specify planner sensory feedback types (visual, haptic, sound, or other sensory cue) for custom triggering conditions (task urgency, priority level, location, time of day, environmental conditions, reminders, calendar type, biometric trigger, neural feedback trigger, biofeedback trigger, or other customizable triggers).

At least one server 106 is further configured to analyze and present user data regarding completed tasks, calendar events, productivity metrics, biofeedback, and other factors in order to assess user's adherence and progress toward stated priorities and plans. At least one server 106 is further configured to use accelerometer data to assess the progress of the user. At least one server 106 is further configured to intelligently reorganize time blocks and tasks and correlate with the multi-sensory feedback. At least one server 106 is further configured to establish optimal environmental condition for each task, syncing environmental control devices to the optimal temperature, lighting, scent, or sound, whether it requires concentration, relaxation, or sleep.

The system utilizes conversational artificial intelligence (AI) to facilitate the setup, activation, adjustment, and automation of routines using natural language commands, accessible via the one or more control modules 104. At least one server 106 alerts users to impending scheduling conflicts via planner light and other sensory feedback mechanisms, with an option for manual override of alerts.

The system further comprises a data consolidation module within the one or more control modules 104 that securely aggregates and harmonizes calendar data from multiple external sources (e.g., Google Calendar, iCloud, Outlook) into a single coherent schedule. This module facilitates user authorization and data privacy while ensuring comprehensive schedule integration. The system further provides an offline synchronization mechanism through a USB-C or wireless connection, enabling the at least one planner to update and display the latest calendar information and associated notifications without needing an active internet connection.

The system further interfaces/integrates with an internal or external (i.e. Siri, Alexa, Google Home, Apple Home) virtual assistant or smart home device, via customizable command and activation sequences in order to control the planner's that interfaces/integrates with an internal or external (i.e. Siri, Alexa, Google Home, Apple Home) virtual assistant or smart home device, via customizable command and activation sequences in order to control the multi-sensory feedback provided to the at least one planner 102.

Figure 9:
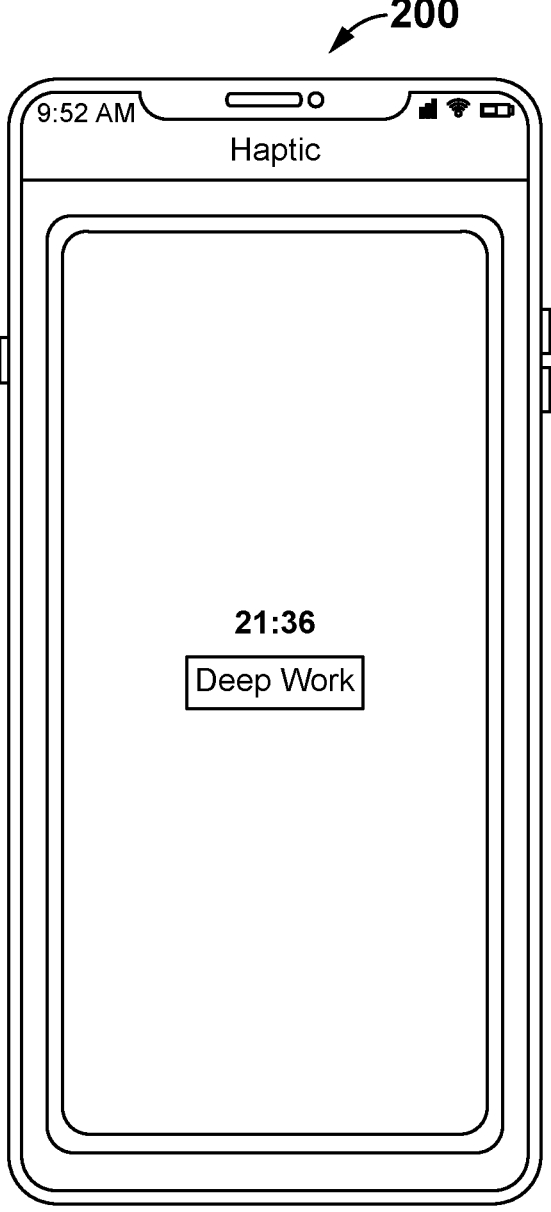
FIG. 9 exemplarily illustrates a screenshot of a user interface for controlling the planner, according to an embodiment of the present invention.
Figure 10:
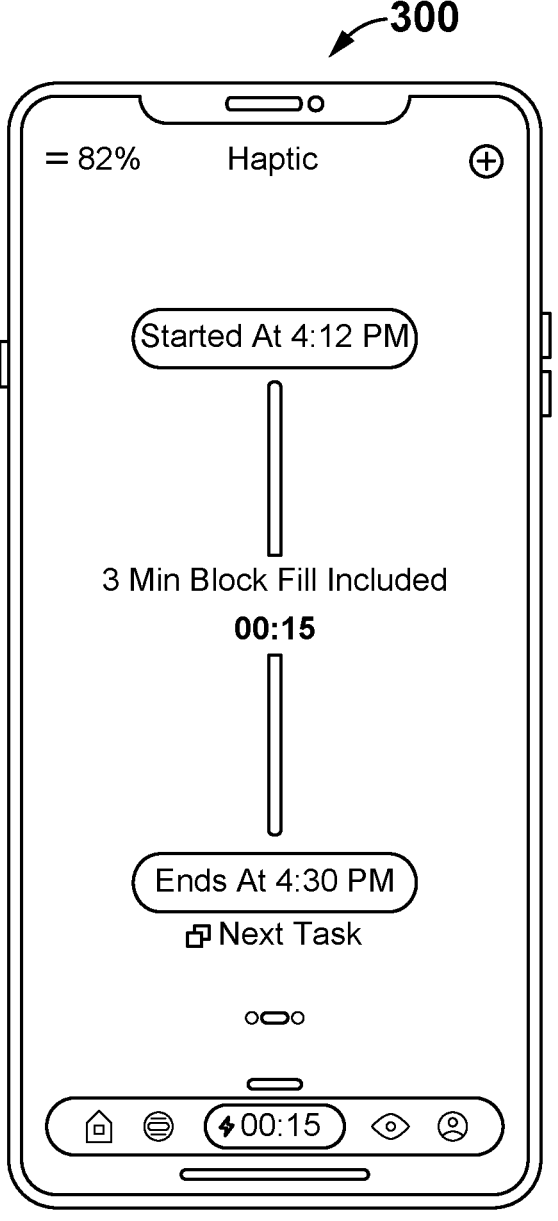
FIG. 10 exemplarily illustrates a screenshot of another user interface for controlling the planner, according to an embodiment of the present invention.
Figure 11:
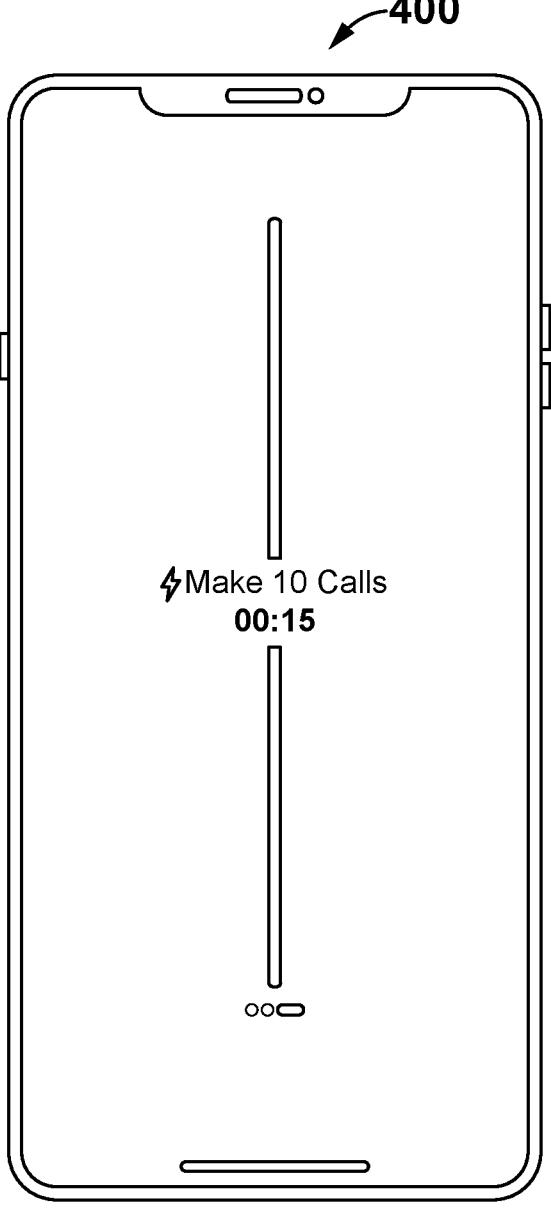
FIG. 11 exemplarily illustrates a screenshot of another user interface for controlling the planner, according to an embodiment of the present invention.

The system further enables the user to control the planner 102 via a mobile application executed at the user device 118. Referring to FIG. 9 to FIG. 11, different user interface (200, 300, 400) of the application is used for controlling the at least one planner 102.

Figure 12:
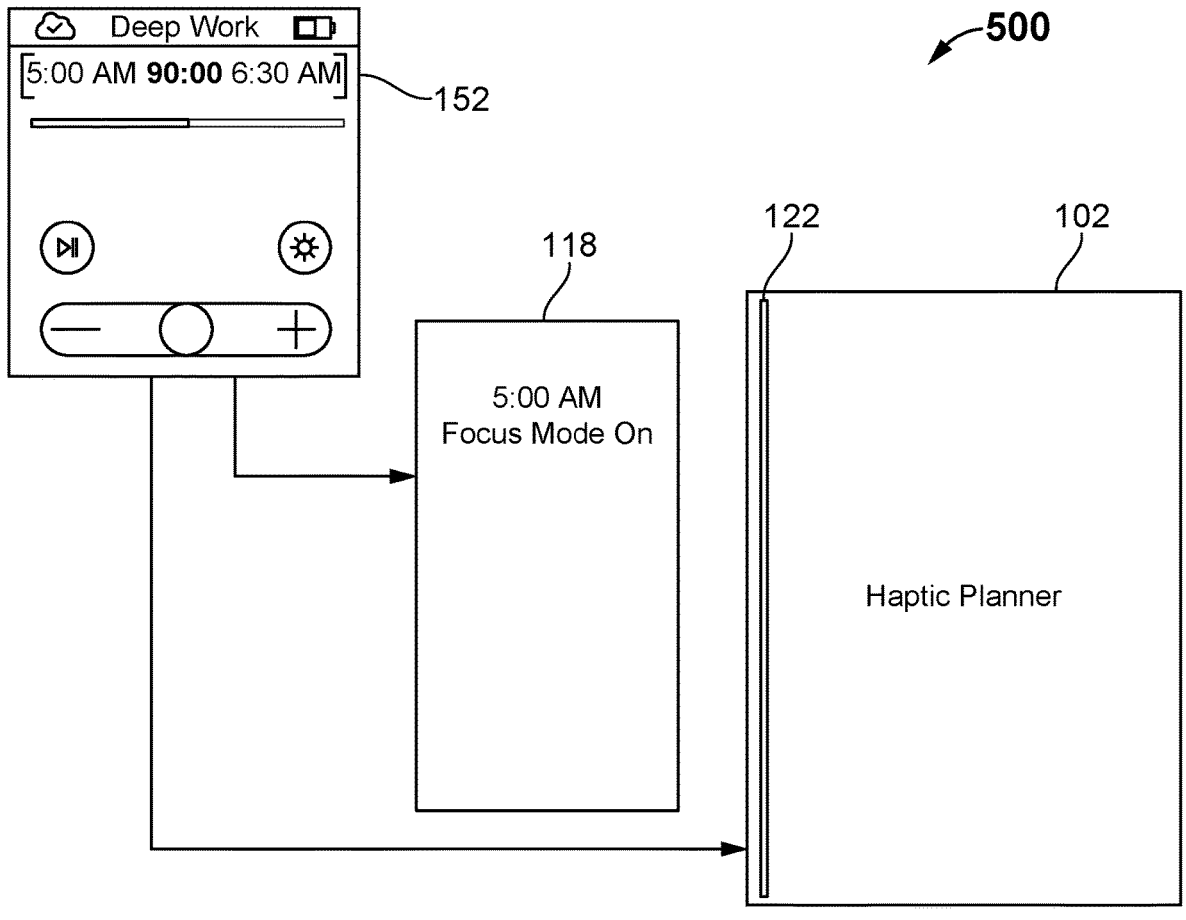
FIG. 12 exemplarily illustrates a method of signaling the planner to provide multi-sensory feedback using the user device regarding the tasks, according to an embodiment of the present invention.

FIG. 12 exemplarily illustrates a method 500 of signaling the at least one planner to provide multi-sensory feedback using the user device regarding the tasks, according to an embodiment of the present invention. The light-cued focus session is initiated with a command from the at least one server 106. As the command is given, the control device 104 starts the timer in the user device 118 and sends the signal to activate the light of the at least one planner 102. The remote controller device 152 communicates with user device 118 to initiate blocking of the app's VPN notification until the timer runs out. The user device 118 locks screen pops with the schedule. The start of the session is signaled via haptic and light feedback.

Figure 13:
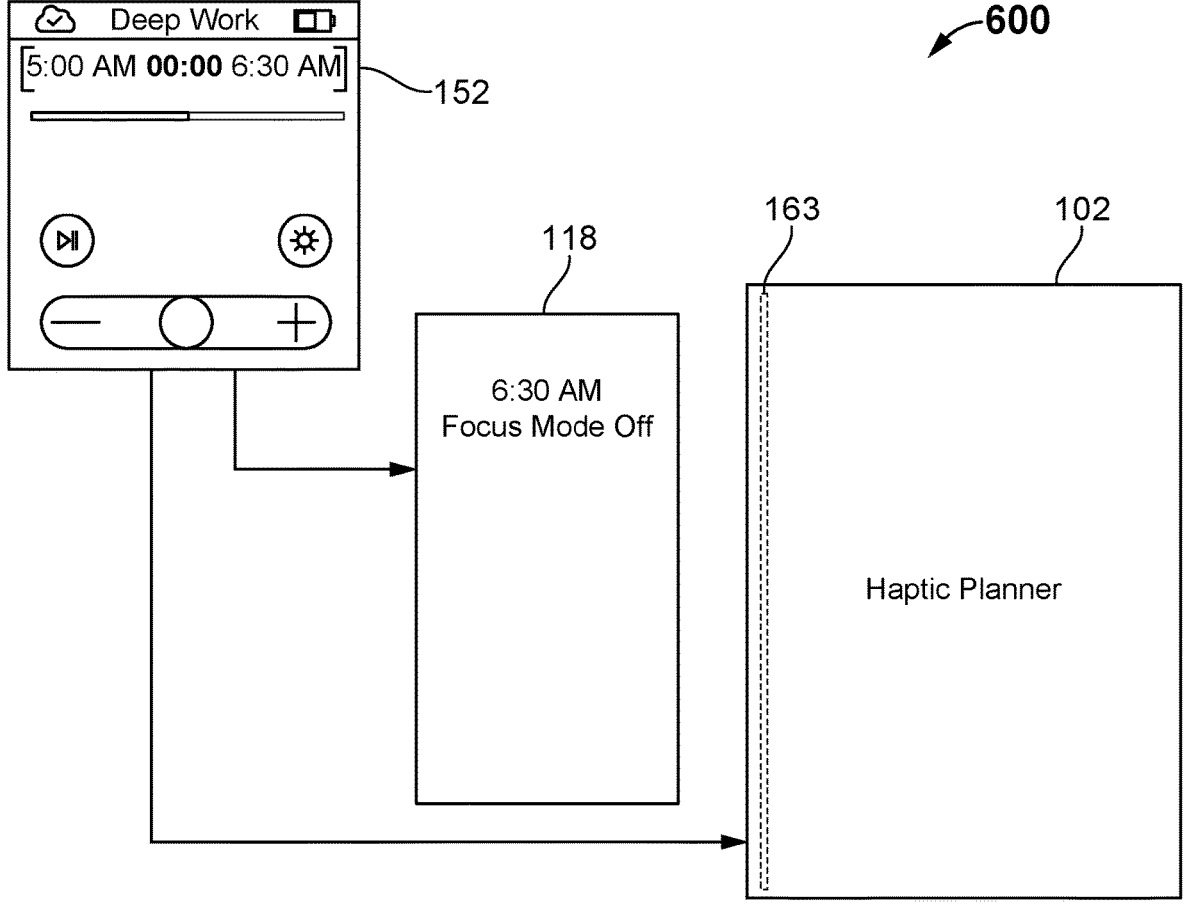
FIG. 13 exemplarily illustrates a method of signaling the planner to provide multi-sensory feedback using the user device regarding an end time of the task session, according to an embodiment of the present invention.
Figure 14:
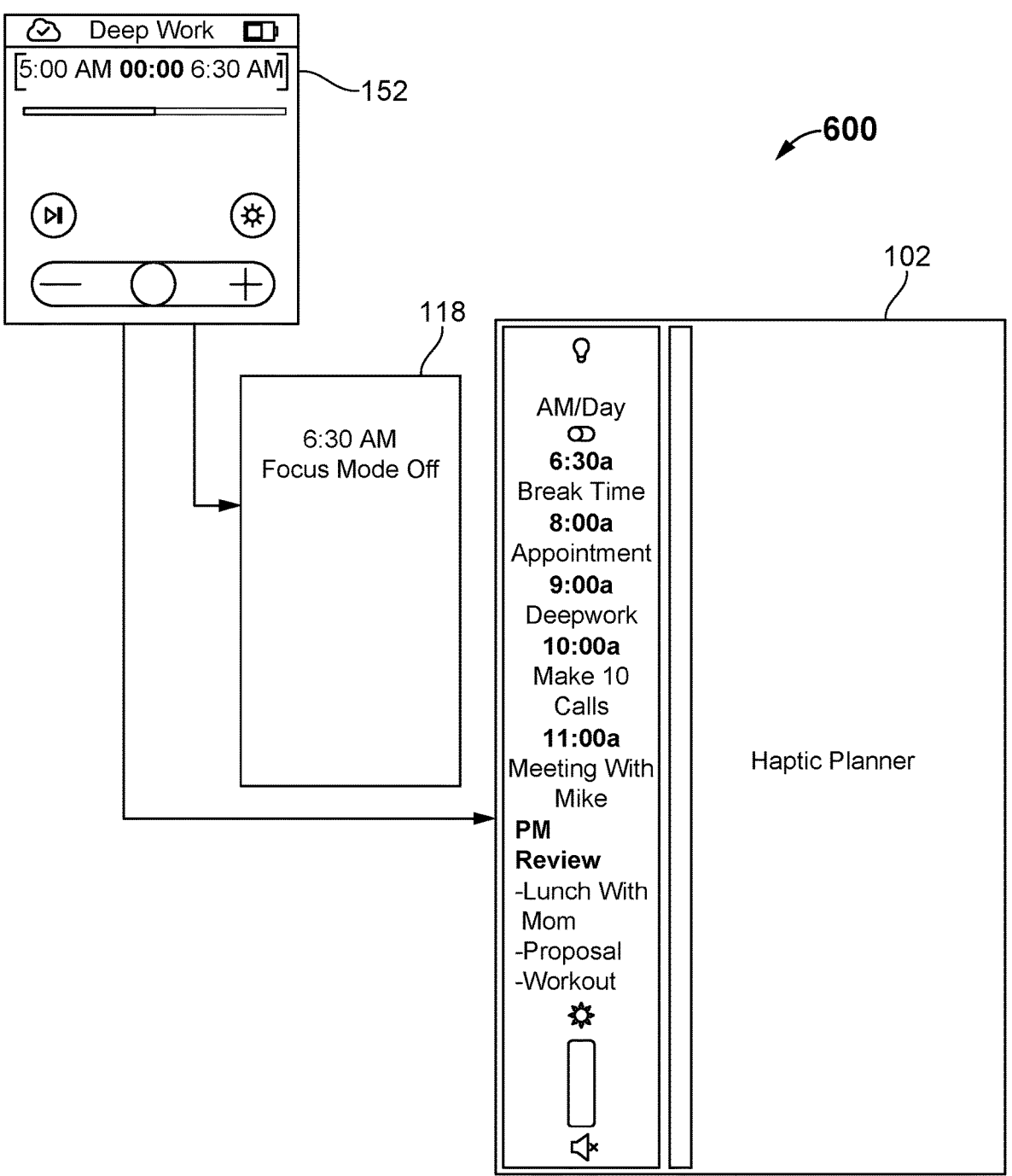
FIG. 14 showing a touch screen on the planner cover, according to an embodiment of the present invention.

FIG. 13 exemplarily illustrates a method 600 of signaling the at least one planner to provide multi-sensory feedback using the user device regarding an end time of the task session, according to an embodiment of the present invention. As the timer runs out, the remote controller device 152 sends the signal to shut off the light or run a user customized session ending sequence to remind the user to check back in or extend the period. The remote signals the user device 118 to turn off the app's notification block until the user reactivates the light timer via remote controller device 152 or user device 118. The session end is signaled by turning off the light or custom light, haptic, and sound sequence per users' preference (ex. Flashing of light). The dotted line 163 represents the closing light sequence, for example, variation in the intensity or brightness of light, and turning on and off of the light feedback in a sequence. FIG. 14 showing the touch screen on the planner cover 120, where it illustrated with a touch bar on the at least one planner 102.

Advantageously, the system is a system designed to change the way individuals engage with planning and journaling. The system enables the integration of multi-sensory feedback mechanisms within a traditional physical paper-based planner or notebook cover. The multi-sensory feedback mechanisms could be controlled through various mechanisms, including the embedded button 126, a mobile application, the customized remote controller 152, and the neural device 114 including the neural feedback receiver. The system has the capability to synchronize with a cloud-based or server-based platform, enabling the integration of user schedules with real-time biofeedback and environmental data, which manipulates the multi-sensory feedback mechanism. The present invention promotes optimal work by adapting to the user's physiological, neurological, and environmental contexts. The system tailors the user experience and improves productivity through personalized settings based on biometric data and ambient environmental conditions.

The system's ability to integrate and analyze biofeedback and environmental data allows it to adjust feedback mechanisms based on the user's current physiological state or external conditions, enhancing the relevance and effectiveness of notifications.

Further, unlike existing planners, the system of the present invention combines light, sound, scent, and haptic feedback in a single planner, offering a more immersive and customizable reminder system. The ability to incorporate neural feedback, biometrics, biofeedback (from wearable devices) and environmental data (such as lighting, noise levels, and temperature) to control reminders and sensory feedback settings in real-time tailors the planning experience to the user's state and environment. This system dynamically updates task reminders and environmental settings based on real-time data analysis, a step beyond the static synchronization of schedules found in current technologies or the no-tech solutions within analog planners.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A paper-based planning and journaling system, comprising:

at least one planner configured to enable recording of information on paper and in digital format;

one or more control modules in communication with the at least one planner, wherein the one or more control modules and the at least one planner are associated with a user, and at least one server in communication with a database, the one or more control modules and the at least one planner, wherein the at least one server is configured to:

receive planner data of the user, wherein the planner data includes schedule related data, task related data, notes related data, priority related data of schedules and tasks, and preferences related data;

receive external data of the user, wherein the external data includes biofeedback data, neural feedback data, biometrics data and environmental data;

enable the at least one planner to provide multi-sensory feedback for the schedules and tasks;

manage and adjust one or more parameters of the at least one planner in real-time, wherein the one or more parameters include light, pattern of display and audio;

dynamically customize the multi-sensory feedback in real-time based on the external data and user data, and dynamically customize the the one or more parameters of the at least one planner in real-time based on the external data and the user data, and wherein the one or more control modules enable the user to control and customize the multi-sensory feedback.

2. The paper-based planning and journaling system of claim 1, wherein the at least one planner comprises a control system and one or more electronic modules in communication with the control system, wherein the one or more electronic modules comprise a network module, a display, one or more buttons, a global positioning system (GPS) module, a temperature sensor, an accelerometer, a haptic motor, one or more audio devices, one or more ports, a microphone, one or more cameras, a removable near field communication (NFC) card and a detachable remote controller device.

3. The paper-based planning and journaling system of claim 1, wherein the one or more control modules comprise a wearable device configured to provide biofeedback of the user, a neural device configured to provide neural feedback of the user, a controller device, a user device, a display of the at least one planner, a plurality of buttons of the at least one planner and one or more virtual assistants.

4. The paper-based planning and journaling system of claim 1, wherein the at least one planner comprises a removable near field communication (NFC) business card.

5. The paper-based planning and journaling system of claim 1, wherein the multi-sensory feedback comprises visual feedback, acoustical feedback, scent feedback and haptic feedback.

6. The paper-based planning and journaling system of claim 1, wherein the environmental data includes light data, location data, weather data, temperature data and sound data.

7. The paper-based planning and journaling system of claim 1, wherein a feedback includes messages, alerts and notification.

8. The paper-based planning and journaling system of claim 1, wherein the at least one server comprises an artificial intelligence module.

9. The paper-based planning and journaling system of claim 1, wherein the at least one server is further configured to suggest one or more tasks in open time blocks based on the planner data and the external data.

10. The paper-based planning and journaling system of claim 1, wherein the at least one server is configured to continuously analyze the planner data and the external data in real-time to manage parameters of the at least one planner and the multi-sensory feedback.

11. The paper-based planning and journaling system of claim 1, wherein the one or more control modules enable to customize duration, intensity, and type of feedback.

12. The paper-based planning and journaling system of claim 1, wherein the one or more control modules enable to customize duration, intensity, and type of feedback via voice control.

13. The paper-based planning and journaling system of claim 1, wherein the at least one server is configured to receive gesture related information of the user to manage parameters of the at least one planner and the multi-sensory feedback.

14. The paper-based planning and journaling system of claim 1, wherein the at least one server is configured to reorganize schedules and tasks to align with user goals.

15. The paper-based planning and journaling system of claim 1, wherein the at least one server is configured to convert user written information to planner data using optical character recognition (OCR), intelligent character recognition (ICR), artificial intelligence (AI) and natural language processing (NLP).

\* \* \* \* \*